May 9, 1961  R. BOWLING  2,983,472
WREATH SUPPORTS FOR GRAVESTONES
Filed Sept. 19, 1960
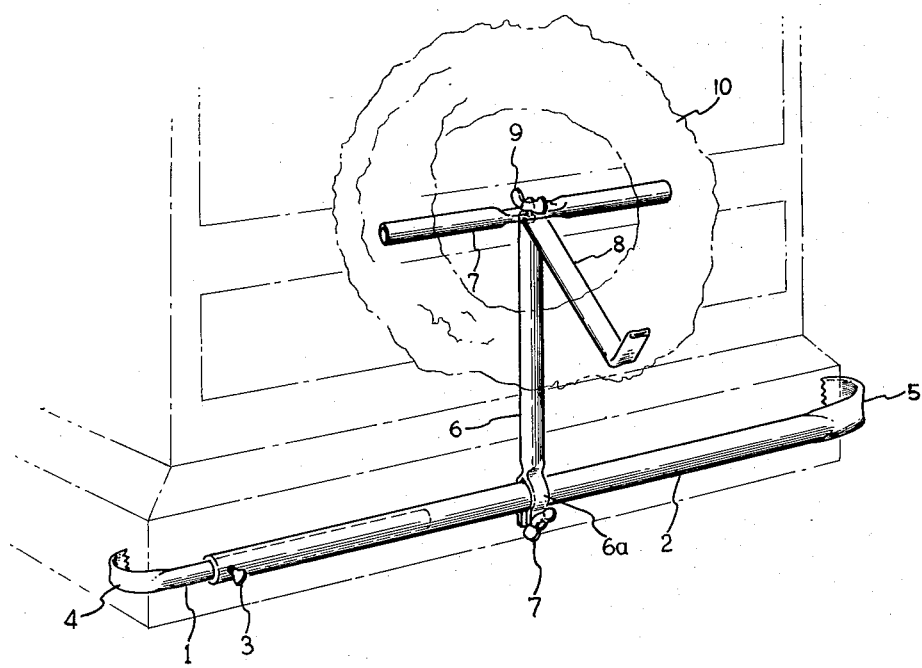
INVENTOR.
Russell Bowling,
BY
ATTORNEYS ര
United States Patent Office 2,983,472
Patented May 9, 1961

2,983,472

WREATH SUPPORTS FOR GRAVESTONES

Russell Bowling, R.R. 2, Butler, Ky.

Filed Sept. 19, 1960, Ser. No. 56,889

5 Claims. (Cl. 248—27.8)

My invention relates to wreath supports for gravestones or monuments.

It is the object of my invention to provide a wreath support made of light metal which can be adjusted by hand to support a wreath up off the ground in such position that the grass may be cut adjacent the gravestone without the necessity of removing the wreath.

In the decorating of gravestones after a funeral it is customary for the family and friends to leave flowers leaning on the gravestone or closely associated with it. The men working in the cemetery performing such jobs as cutting the grass, to save themselves work usually throw the wreaths and flowers aside. As an example a well made wreath which normally remains fresh and non-wilted for as long as a month may, to suit the convenience of the men working in the cemetery, be thrown away and discarded the next day.

Broadly it is my object to provide a simple and inexpensive support or clamp which may be put up in a few minutes which will enable a wreath to be mounted up off the grass so that the full life of the wreath may be obtained.

The appearance of a wreath lying on the ground near a gravestone is very much like a Christmas wreath would be if it were taken down from a door or window and put on the floor. To be appreciated a wreath must be held in a semi-upright position and thus it is one of the objects of my invention to display wreaths in connection with gravestones to the full extent of their beauty and decorativeness.

The foregoing objects and other objects to which reference will be made in the ensuing description, I accomplish by that certain combination and arrangement of parts of which I have shown a preferred embodiment.

In the drawings:

The figure represents a perspective view of the wreath support in position on a gravestone elevated to a position to show off the wreath to its full advantage.

Two pieces of light pipe, one of lesser diameter than the other, are telescoped together. Thus I have shown the thinner piece 1 telescoped within the larger piece 2 and held together with a thumb screw 3. The ends of the pieces 1 and 2 are curved around as indicated at 4 and 5. These curved ends 4 and 5 may be bent or twisted so as to bind against the gravestone.

On the large piece 2 of the telescoped pipe pieces there is an upright pipe 6 having a yoke support 6a embracing the pipe 2 and held in position by another thumb screw 7.

At the top of the upright pipe 6 there is a cross bar 7 and a downwardly inclined arm 8. Both the cross bar and the inclined arm are held in adjusted position by the thumb screw 9.

The wreath indicated at 10 is supported on the cross bar 7 and inclined arm 8.

A few moments time will be enough to mount the wreath support in position and in the mounting it is important that all the assembling is accomplished by the three thumb screws. Also the curved ends 4 and 5 are so pliable that they can be manually bent out to clamp against the side edges of the gravestone or its base. Normally the pieces 1 and 2 fit down in the grass and the only portion of the support which will be visible will be the lower end of the upright 6. The crossbar and downwardly inclined arm will be concealed by the flower wreath.

Having thus described my invention what I claim as new and desire to secure by Letters Patent is:

1. A gravestone wreath support comprising two telescoping pieces of light pipe adjustably secured together with a thumb operated screw, said pieces of pipe having curved ends of thin metal adapted to engage the side edges of a gravestone, an upright support adjustably mounted on one of the telescoping pieces, and an inclined support for a wreath adjustably secured to the upright support with another thumb screw.

2. A gravestone wreath support comprising two telescoping pieces of light pipe adjustably secured together with a thumb operated screw, said pieces of pipe having curved ends of thin metal adapted to engage the side edges of a gravestone, an upright support adjustably mounted on one of the telescoping pieces, and an inclined support for a wreath adjustably secured to the upright support with another thumb screw, said two pieces of pipe being thin enough to sink in the grass adjacent the base of said gravestone.

3. A wreath support to be manually mounted on a gravestone comprising telescoping pipe members adjusted as to length with a thumb screw, said members having pliable curved ends to engage the side edges of a gravestone, an upright member mounted on one of the telescoping pipe members having a yoke with a thumb screw for fastening the upright member to the telescoping member, and inclined supports manually adjustable to the upright support.

4. A wreath support to be manually mounted on a gravestone comprising telescoping pipe members adjusted as to length with a thumb screw, said members having pliable curved ends to engage the side edges of a gravestone, an upright member mounted on one of the telescoping pipe members having a yoke with a thumb screw for fastening the upright member to the telescoping member, and inclined supports manually adjustable to the upright support, said inclined supports consisting of a cross bar and a downwardly inclined bar secured to said upright by a thumb screw.

5. In combination with a gravestone in a grass covered portion of a cemetery, a support for a wreath extending above the level of the grass surrounding the gravestone and said support being manually adjustable to a position supporting a wreath above the level of the grass.

References Cited in the file of this patent

UNITED STATES PATENTS

| 926,840 | Bagaason | July 6, 1909 |
|---|---|---|
| 1,958,716 | Roach | May 15, 1934 |
| 2,833,502 | Wildeboor | May 6, 1958 |